(12) United States Patent
Morgan

(10) Patent No.: US 10,450,206 B2
(45) Date of Patent: Oct. 22, 2019

(54) SYSTEM AND METHOD TO TREAT FLUIDS BY SONOELECTROCHEMISTRY

(71) Applicant: KP2M LIMITED, Swansea (GB)

(72) Inventor: Philip Graeme Morgan, Swansea (GB)

(73) Assignee: KP2M Limited, Swansea (GB)

( * ) Notice: Subject to any disclaimer, the term of this patent is extended or adjusted under 35 U.S.C. 154(b) by 178 days.

(21) Appl. No.: 15/557,869

(22) PCT Filed: Mar. 14, 2016

(86) PCT No.: PCT/GB2016/050692
§ 371 (c)(1),
(2) Date: Sep. 13, 2017

(87) PCT Pub. No.: WO2016/146986
PCT Pub. Date: Sep. 22, 2016

(65) Prior Publication Data
US 2018/0072591 A1 Mar. 15, 2018

(30) Foreign Application Priority Data

Mar. 13, 2015 (GB) .................................. 1503638.7

(51) Int. Cl.
*C02F 1/36* (2006.01)
*C02F 1/00* (2006.01)
(Continued)

(52) U.S. Cl.
CPC ................ *C02F 1/36* (2013.01); *C02F 1/008* (2013.01); *C02F 1/32* (2013.01); *C02F 1/325* (2013.01);
(Continued)

(58) Field of Classification Search
CPC .. C02F 1/008; C02F 1/32; C02F 1/325; C02F 1/36; C02F 1/463; C02F 1/4672;
(Continued)

(56) References Cited

U.S. PATENT DOCUMENTS

| 6,245,207 B1 | 6/2001 | Yasuda et al. |
| 2003/0164308 A1 | 9/2003 | Schlager et al. |
| 2009/0230059 A1 | 9/2009 | McGuire et al. |

FOREIGN PATENT DOCUMENTS

| CN | 202265477 U | 6/2012 |
| CN | 104129833 A | 11/2014 |

(Continued)

OTHER PUBLICATIONS

Search and Examination Report for corresponding GB 1503638.7, dated Sep. 28, 2015.
(Continued)

*Primary Examiner* — John Kim
(74) *Attorney, Agent, or Firm* — Curotolo Sidoti Co., LPA; Salvatore A. Sidoti; Floyd Trillis, III

(57) ABSTRACT

A fluid treatment unit (TU) comprises a first anode electrode (5), a second grounded electrode (7) and an ultrasound generator (12) mounted to the grounded electrode (7), the grounded electrode (7) and a facing first anode electrode (5) defining between them a treatment zone (9), the unit TU having an inlet (2) for introduction of fluid to the treatment zone (9) and an outlet (3) for egress of treated fluid from the treatment zone (9), the treatment zone (9) providing a flow path along which fluid entering through the inlet (2) is flowable towards the outlet (3), the flow path extending substantially along the surface of both the second ground electrode (7) and a facing first anode electrode (5).

20 Claims, 4 Drawing Sheets

(51) Int. Cl.
   *C02F 1/463* (2006.01)
   *C02F 9/00* (2006.01)
   *C02F 1/32* (2006.01)
   *C02F 1/467* (2006.01)
   C02F 101/20 (2006.01)
   C02F 103/10 (2006.01)

(52) U.S. Cl.
   CPC ............ *C02F 1/463* (2013.01); *C02F 1/4672* (2013.01); *C02F 9/00* (2013.01); C02F 2101/203 (2013.01); C02F 2103/10 (2013.01); C02F 2201/009 (2013.01); C02F 2201/4614 (2013.01); C02F 2201/46135 (2013.01); C02F 2201/46145 (2013.01); C02F 2209/40 (2013.01); C02F 2301/022 (2013.01); C02F 2305/023 (2013.01); Y02A 20/212 (2018.01); Y02W 10/37 (2015.05)

(58) Field of Classification Search
   CPC .. C02F 9/00; C02F 2009/40; C02F 2305/023; C02F 2301/022; C02F 2201/46145; C02F 2201/4614; C02F 2201/46135; C02F 2201/009; C02F 2103/10; C02F 2101/203; Y02A 20/212; Y02W 10/37
   See application file for complete search history.

(56) References Cited

FOREIGN PATENT DOCUMENTS

| | | |
|---|---|---|
| DE | 10 2010 061 925 A1 | 5/2012 |
| EP | 1174394 A2 | 1/2002 |

OTHER PUBLICATIONS

PCT/GB2016/050692—International Search Report, dated May 13, 2016.
PCT/GB2016/050692—International Written Opinion, dated May 13, 2016.

SYSTEM AND METHOD TO TREAT FLUIDS BY SONOELECTROCHEMISTRY

CROSS REFERENCE TO RELATED APPLICATIONS

This application is a national stage application under 35 U.S.C. § 371 of International Application No. PCT/GB2016/050692, filed 14 Mar. 2016, which claims priority from Great Britain Patent Application No. 1503638.7, filed 13 Mar. 2015, both of which applications are incorporated herein by reference.

The invention relates to the treatment of fluids. More particularly, the invention relates to the treatment or decontamination of fluids using sonoelectrochemistry.

Treatment or decontamination of fluids is frequently required to remove entrained matter (e.g. suspended or dissolved matter) and/or to disinfect impurities. The fluid to be treated or decontaminated may especially be contaminated water, for example, drinking water, waste water, industrial effluents, shipboard waters, process waters, ground run-off waters or leachate water. The fluids may contain one or more contaminants, for example, inorganics, organics, suspended material, colloidal matter, metals, organo-metalloids, radionuclides, herbicides, pesticides and bacteria, viruses and other microorganisms.

To date, decontamination has been widely achieved by physical and/or chemical means. For example, utilising, oxidation and reduction, using filters, settlers, chemicals and biological processes. As contaminants in fluids have become more complex over the last century due to increasing industrialization, the use of conventional treatment methods has become less effective. At the same time, the increase in the stringency of the requirements as to the purity of waste streams, in particular, effluent streams, has increased the areas of industrial operation for which decontamination of waste or other fluid streams is needed or required.

The use of electrolysis for the treatment of liquids is well documented. Similarly the use of sonochemistry for treating liquids, as well as a means for changing the chemical properties of fluids, has been proposed. Typically, in electrolysis, a DC or AC current applied across the anode and cathode electrodes immersed in the fluid (electrolyte) results in dissolution of the anode to produce reactive reagents (e.g. aluminium ions, ferrous and ferric ions) whilst at the cathode electrode water hydrolyses to produce hydrogen ions and hydroxyl ions. The net result of these reactions is the production of, for example, aluminium hydroxide, ferric hydroxide or ferrous hydroxide which acts as a coagulant and adsorbs contaminants from the fluid. These reactions are typically referred to as electro-coagulation and electro-flocculation. Sonochemistry (ultrasound) has been long established for cleaning and for mixing, and to accelerate chemical processes. Ultrasonication (typically 15-200 kHz or 20 to 200 kHz frequency) generates alternating low pressure and high pressure waves in fluids, leading to the formation and violent collapse of small vacuum bubbles. This phenomenon is termed cavitation and causes high speed impinging liquid jets and strong hydrodynamic shear-forces. These effects together with the applied energy input and material transfer through the boundary layers of the fluid are used for de-agglomeration of contaminants, disintegration of cells, mixing of reactants, production of free radicals (e.g. hydroxyl radical). Such sonochemical effect leads to a substantial reduction in reaction time and cleaning effect of objects immersed in an ultrasonic device.

The combination of sonochemistry with electrolysis offer the advantage of increased rates of chemical reaction, negate electrode fouling by destroying the Helmoltz, Stern boundary layers on the anode electrode surfaces and passivation when electrically excited, increase oxidative reactions through the production of hydroxyl radicals and increase mixing effects within the reactor device. The present state of the art publications describe such devices as consisting of a metallic ultrasonic horn (also known as acoustic horn, sonotrode, acoustic waveguide, ultrasonic probe) immersed in an electrolytic reactor containing contaminated fluids and immersed anode and cathode attached to an electrical power supply.

A drawback with the known processes for decontamination of liquids that make use of an ultrasonic probe and electrolytic cell is the potential electrical short circuiting between the ultrasonic probe and the anode and cathode electrodes or the reactor device when both ultrasonic probe and electrodes receive an applied voltage. Careful placement of the ultrasonic probe and operation of the electrolytic cell is required to avoid electrocution or electrical damage to the devices.

It is an object of the current invention to at least partially mitigate one, some or all of the drawbacks associated with the prior art.

The present invention provides, in a first aspect, a fluid treatment unit comprising first anode electrode, a second grounded electrode and an ultrasonic generator means mounted on or operably connected to said grounded electrode, a treatment zone being provided between the first anode electrode and second grounded electrode, the treatment zone having an inlet for introduction of fluid to be treated to said treatment zone and an outlet for egress of fluid from said treatment zone, the treatment zone providing a flow path along which fluid entering through the inlet can flow towards the outlet, the flow path extending substantially along the surface of each of the electrodes.

The unit of the invention enables decontamination of fluids, especially of contaminated water and waste streams to be carried out in a simple, efficient and effective manner. In particular, because the decontamination can rely, at least in part, on sonication and electrolysis it can avoid the requirement for the addition of liquid chemical(s) compared to existing technology. Moreover, sonication can negate electrode fouling and build-up of passivation layers along the electrode surfaces in the treatment zone. It is believed that the unit of the invention enables electrolysis and sonication to be applied satisfactorily to both a continuous decontamination procedure and/or batch process because the arrangement is such that the liquid stream is caused to flow along the surfaces of the electrodes at which electrolysis and sonication reactions can occur and when in batch mode the sonication process prevents any electrode fouling from passivation such as build-up of gas bubbles or 'floc' material which can reduce the amperage and increase the voltage power across the electrodes. In the unit of the invention, however, such reaction products are prevented from occurring in the reactor which may process flow rates of up to 10 MLD (million liters per day) or up to or over 100 MLD or up to or over 200 MLD or up to or over 500 MLD.

The inlet may comprise a channel that extends across the treatment zone in a direction transverse to the principal direction of flow within the treatment zone. The purpose of such a construction is to enable fluid to be introduced into the treatment zone in a relatively even laminar flow. The outlet may comprise a channel that extends across the treatment zone in a direction transverse to the principal direction of flow within the treatment zone.

The unit may further comprise a source of UV light, which is arranged to irradiate fluid that passes through the unit. The UV source may be arranged to irradiate fluid downstream of the treatment zone. The UV source may be adjacent or proximate said outlet means.

The ultrasonic generator means may comprise a single piezoelectric element or a plurality of piezoelectric elements arranged in an array on the second grounded electrode. Said ultrasonic generator means may be operable or may operate at an operating frequency of 15-200 kHz or 20-200 kHz.

Preferably the grounded electrode defines a tank or container. The first anode electrode may comprise a plate electrode with a pair of matching major surfaces. The first anode electrode may be located within the tank or container, such that fluid flowing from the inlet to the outlet may flow over and/or across a, the, one or both major surfaces of the anode electrode. The anode electrode is electrically insulated from the grounded electrode.

The invention also provides a fluid treatment system comprising a fluid treatment unit according to the invention. The system may include a power source for applying a positive voltage to the first electrode and a ground (earth) to the second grounded electrode. The arrangement may be such that an AC voltage and or DC voltage of varying frequencies and waveform may be applied to the first electrode to provide an operating amperage of 1-100,000 amps or 1-10,000 amps. The system may include a power source for applying a voltage to the ultrasonic generator means.

The system advantageously comprises means for monitoring one or more electrical characteristics between the first and second electrodes in the treatment zone such that the voltage between the first and second electrodes can automatically vary to achieve a set current amperage across the first and second electrodes, and a monitoring means for monitoring one or more chemical parameters of the fluid either upstream and or downstream of the treatment zone and automatically set the operating amperage for the treatment zone defined by the first and second electrode.

Advantageously, the system comprises a control means. The control means is preferably arranged to control the applied current for electrolysis and or the applied frequency and/or power to the ultrasonic generator means and array of piezoelectric elements in dependence on one or more characteristics monitored by the monitoring means.

The system may also comprise a mixing unit or zone, downstream of the treatment unit. The system may also comprise a clarifying unit or zone downstream of the mixing unit or zone.

The invention further provides a method of treating a fluid, comprising causing fluid to flow along a surface of each of first anode electrode and second opposed grounded electrode and simultaneously applying a voltage across said first and second electrodes in order to generate an electrolytic current through the flowing liquid and energising an ultrasonic generator means mounted to the second electrode and to generate an ultrasonic sound wave through the flowing liquid. Advantageously, the liquid is caused to flow along a flow path that is bounded on opposing sides by the opposed electrodes. Preferably, in transverse section relative to the direction of flow, the flow path is of elongate rectangular configuration. Advantageously, however, the area of cross section of the flow path is substantially uniform along the direction of flow of the fluid.

The separation between the first anode electrode and facing second grounded electrode may be 100 mm or less. Advantageously, the separation between the first anode electrode and second electrodes is 80 mm or less. Advantageously, the separation between first and second electrodes is 5 mm or greater.

The length of the flow path may be 100 mm or more and advantageously, 500 mm or more. Advantageously, the length of the flow path is 20,0000 mm or less or 10,000 mm or less.

Oxidants and oxidizing or hydroxyl radicals may be generated in the fluid by the ultrasonic probe and/or electrode as the fluid passes through the treatment zone. Hydrogen peroxide may be generated as a result of the sonoelectrochemistry as the fluid passes through the treatment zone. Hydrogen peroxide in the presence of ferrous ion or ferric salts (which can be generated when iron electrodes are used), can further generate hydroxyl radicals via Fenton chemistry for organic mineralization. Further, chloride ions when reacted with oxygen over-potential electrodes can generate powerful oxidants and radicals for the destruction of organic and nitrogenous contaminants. Further when combined with a UV light source a photo-Fenton reaction can be initiated for the destruction of organic contaminants. Such reactions generating hydroxyl radicals are commonly referred to as advanced oxidation processes (AOP).

The present invention provides a fluid treatment unit comprising first anode electrode, a second grounded electrode and externally mounted ultrasonic probe, defining between the first anode and second grounded electrode a treatment zone having inlet means for introduction of fluid in the said treatment zone and outlet for exit of fluid from the said treatment zone, the treatment zone providing a flow path along which fluid entering through the inlet means can flow towards the outlet means, the flow path extending substantially along the surface of each of the electrodes.

The unit of the invention enables decontamination of fluids, especially of contaminated water and waste streams to be carried out in a simple, efficient and effective manner. In particular, because the decontamination relies at least in part on sonication and electrolysis thus avoiding the addition of liquid chemical compared to existing technology and negates electrode fouling and build-up of passivation layers along the electrode surfaces in the treatment zone. It is believed that the unit of the invention enables electrolysis and sonication to be applied satisfactorily to both a continuous decontamination procedure and or batch process because the arrangement is such that the liquid stream is caused to flow along the surfaces of the electrodes at which electrolysis and sonication reactions are occurring and when in batch mode the sonication process prevents any electrode fouling from passivation such as build-up of gas bubbles or 'floc' material which can reduce the amperage and increase the voltage power across the electrodes. In the unit of the invention, however, such reaction products are prevented from occurring in the reactor which may process flow rates of up to, and in some cases more than, 10 MLD (million liters per day).

The inlet means may comprise a channel that extends across the treatment zone in a direction transverse to the direction of flow within the treatment zone. That enables the fluid to be introduced into the treatment zone in a relatively even laminar flow. The outlet means may comprise a channel that extends across the treatment zone in a direction transverse to the direction of flow within the treatment zone.

The unit may further comprise a source of UV light, which is arranged to irradiate fluid that passes through the unit. The UV source may be arranged to irradiate fluid that is downstream of the treatment zone. The UV source may be at or in the vicinity of the outlet means.

The invention also provides a fluid treatment system comprising a fluid treatment unit according to the invention. The system may include a power source for applying a positive voltage to the first electrode and a ground (earth) to the second grounded electrode. The arrangement may be such that an AC voltage and or DC voltage of varying frequencies and waveform may be applied to the first electrode to provide an operating amperage of 1-10,000 amps. The system may include a power source for applying a voltage to the ultrasonic probe. The ultrasonic probe may consist of a singular piezoelectric element or a plurality of piezoelectric elements arranged in an array on the second grounded electrode. The arrangement may be that the AC or DC voltage of varying power and frequency to provide an operating frequency of 20-200 kHz.

The system advantageously comprises means for monitoring one or more electrical characteristics between the first and second electrodes in the treatment zone such that the voltage between the first and second electrodes can automatically vary to achieve a set current amperage across the first and second electrodes, and a monitoring means for monitoring one or more chemical parameters of the fluid either upstream and or downstream of the treatment zone and automatically set the operating amperage for the treatment zone defined by the first and second electrode.

Advantageously, the system comprises a control means. The control means is preferably arranged to control the applied current for electrolysis and or the applied frequency to the ultrasonic probe and array of piezoelectric elements in dependence on one or more characteristics monitored by the monitoring means.

The invention further provides a method of treating a fluid, comprising causing fluid to flow along a surface of each of first anode electrode and second opposed grounded electrode and simultaneously applying a voltage across said first and second electrodes in order to generate an electrolytic current through the flowing liquid and a voltage to the ultrasonic probes and array of piezoelectric elements in order to generate an ultrasonic sound wave through the flowing liquid. Advantageously, the liquid is caused to flow along a flow path that is bounded on opposing sides by the opposed electrodes. Preferably, in transverse section relative to the direction of flow, the flow path is of elongate rectangular configuration. Advantageously, however, the area of cross section of the flow path is substantially uniform along the direction of flow of the fluid. The separation between the first and second electrodes may not be more than 100 mm. Advantageously, the separation between the said first and second electrodes is not more than 80 mm. Advantageously, the separation between first and second electrodes is not less than 5 mm.

The length of the flow path may be not less than 100 mm, and advantageously, not less than 500 mm. Advantageously, the length of the flow path is not more than 10,000 mm.

Hydroxyl radicals may be generated in the fluid by the ultrasonic probe as the fluid passes through the treatment zone. Hydrogen peroxide may be generated as a result of the sonoelectrochemistry as the fluid passes through the treatment zone. Hydrogen peroxide in the presence of ferrous ion or ferric salts when using iron electrodes, can further generate hydroxyl radicals via Fenton chemistry for organic mineralization. Further when combined with UV light source a photo-Fenton reaction can be initiated for the destruction of organic contaminants. Such reactions generating hydroxyl radicals are commonly referred to as advanced oxidation processes (AOP).

The treatment method of the invention may be used for the treatment of any fluid, especially contaminated liquid streams such as contaminated water streams selected from wastewater, industrial effluents, process waters, ground water, rivers and leachates. The method may be used, with appropriate selection of conditions in the treatment zone, to decontaminate fluids containing inorganics, organics, suspended and colloidal material; metals, organo-metalloids, radionuclides, bacteria, viruses and other microorganisms.

Where UV irradiation is included, the treatment method is especially effective in the removal or metals and oxidative destruction of organic contaminants such as PCBs or breakdown of surfactants, pesticides and herbicides or long chained organics into short chain residues.

BRIEF DESCRIPTION OF THE DRAWINGS

The invention will now be described by way of example only and with reference to the accompanying drawings, in which:—

Referring to FIG. 1, a sonoelectrochemical treatment system TS comprises a treatment unit TU, the treatment unit TU comprises a sonoelectrochemical cell 1, in this embodiment a pair of parallel sonoelectrochemical cells 1a, 1b, and an inlet conduit 2 and an outlet conduit 3. The system TS further comprises an electrolysis power supply 4, an electrode 5 for each cell 1a, 1 b connected to the electrolysis power supply 4 by a busbar 6. The grounded electrode 7 provides a reactor housing or tank T fluidly connected to the inlet conduit 2 and outlet conduit 3. The inlet conduit is provided or formed with a perforated channel 8 to provide even laminar flow into the treatment zone 9 for the cell 1 (in this embodiment for each cell 1a, 1b). The treatment zone 9 is defined as the space between electrode 5, ground electrode 7 (which provides the housing or tank T) and extending to the transverse outlet weir 10. The electrodes 5 extend into the treatment zone 9 of each cell 1a, 1 b and are secured to the ground electrode 7 by means of insulated sheathed fixings 11 (×3 shown). The ultrasound probe consists of an array of piezoelectric transducers 12 (×8 shown and four for each cell 1a, 1 b) connected to the ultrasonic power supply 13. An optional UV lamp 14 may be secured downstream of the treatment zone 9 after the transverse outlet weir 10 and preferably receives power from UV power supply 16.

Figure 1:
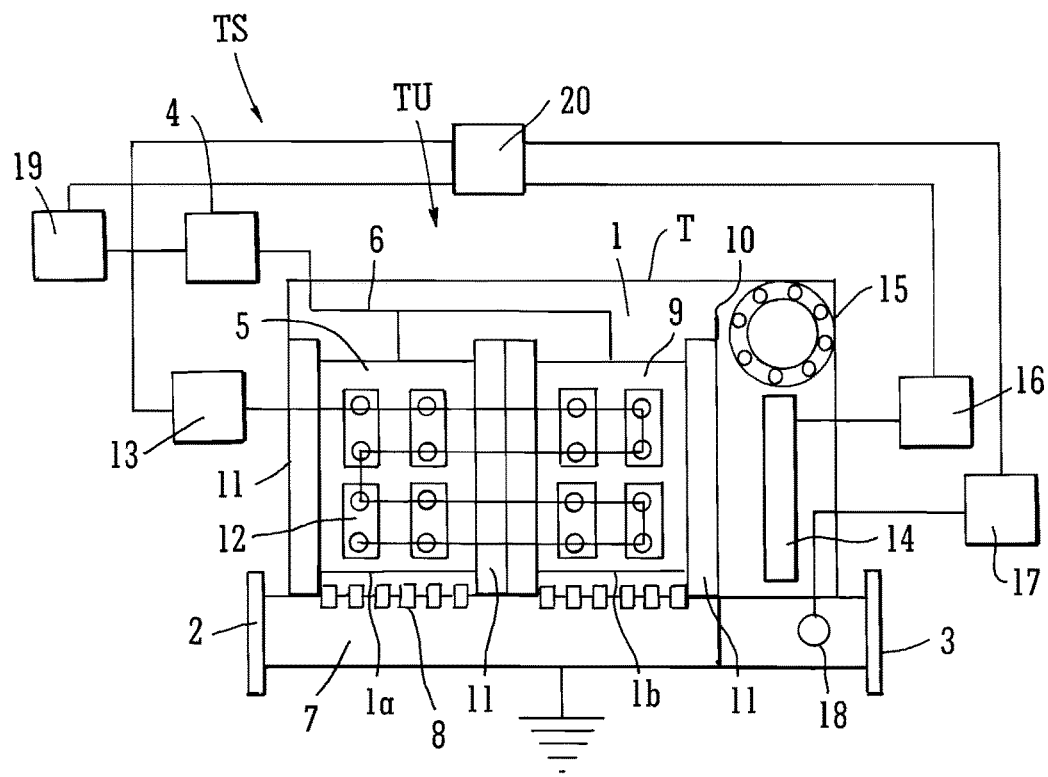
FIG. 1 is a longitudinal cutaway section of a treatment unit according to the invention.

In addition or instead of the UV lamp 14, a water quality monitoring device 17 may be included along with its water quality probe 18.

An electrical monitoring instrument 19 may be included in the electrolysis power supply 4. The electrical monitoring instrument 19, water quality monitoring device 17, UV lamp power supply 16, ultrasonic power supply 13 feed back to a master controller 20. An overflow outlet 15 is provided in the sonoelectrochemical cell 1. It will be appreciated that, if desired, the positions of the inlet conduit 2 and outlet conduit 3 may be interchanged (or the direction of flow may be reversed) or the positions of the inlet conduit 2 and outlet conduit 3 may be altered, provided that the liquid passes across the electrodes 5 for treatment. It may be advantageous under some circumstances to use the overflow outlet 15 as a return outlet to return partially treated liquid for recycling through the sonoelectrochemical cell 1. Such a recycle facility allows poorly conducting liquids, difficult 'hard' liquids, or liquids with high pollution loading to receive multiple passes to achieve the appropriate level of required treatment. Whilst the ground electrode 7 is preferably constructed of stainless steel or similar material, the electrode 5 (anode) may be constructed of various conducting materials. Selection of appropriate materials may be based on waste stream characteristics and treatment requirements. For example iron is especially advantageous for oil removal because it provides effective destabilization for oil removal, aluminium is effective for phosphate, suspended solids and metal removal and oxygen over-potential materials as a mixed metal oxides of platinum are effective for oxidation.

Figure 2:
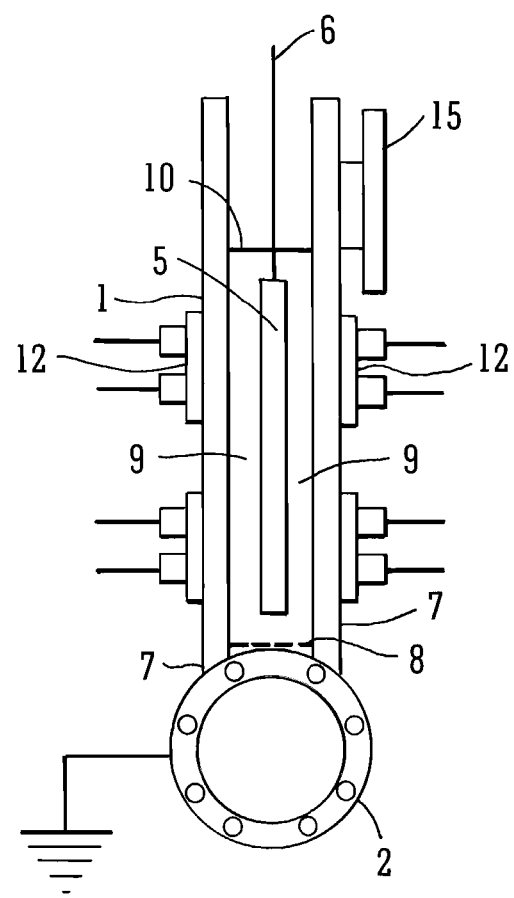
FIG. 2 is a transverse cutaway section through the treatment unit of FIG. 1.

With reference to FIG. 2, the ground electrode 7 integrates the inlet conduit 2 and outlet conduit 3 and provides the reaction tank T. The electrode 5 is fixed centrally by the insulated sheathed fixings 11 such that the ground electrode 7 wraps around the outside opposing surfaces of the electrode 5. The piezoelectric transducers 11 are mounted externally on the ground electrode so that there are two opposing treatment zones 9 defined between ground electrode 7, electrode 5 and ground electrode 7. Such an electrode design is mono-polar and has the advantage of simple design, doubles the flow and treatment capabilities and has increased electrical capacitance over bi-polar electrode arrangements resulting in lower voltage requirements of the treatment unit TU. The perforated channel 8 along the bottom edge of the ground electrode 7 provides laminar flow past each of the outer surfaces of electrode 5. In the embodiment shown the thickness of the electrode 5 is advantageously within the range of 3 to 25 mm or 3 to 50 mm or 3 to 100 mm and shows two electrodes each of approximately 1200 mm×800 mm. Advantageously having the facility to house multiple electrodes 5 also allows various electrode materials to be used simultaneously within the treatment zone 9 such as aluminium, iron, magnesium, oxygen over potential metals, carbon based materials, impregnated carbon and graphite and other conducting and semi-conducting materials. In such a reaction cell typical volumes of flow may be 20,000 liters an hour. The treatment unit TU may be varied in size to cater for appropriate volumes of liquid to be treated by adding or subtracting the first anode electrode and the size of the second grounded electrode casing. Referring to FIG. 2, in the embodiment eight piezoelectric transducers are show on each side of the ground electrode 7, extending across the treatment zone 9. It will be appreciated that a plurality of piezoelectric transducers may be required depending upon the size of the treatment unit, application, contaminant level and desired treatment outcome. In the drawing, the sonoelectrochemical cell has been drawn as rectangular but may be square, cylindrical or any other shape, provided that the electrode and ground electrode are spaced from one another and liquid can enter and leave the treatment zone.

In use, liquid is pumped by an external pump (pump not shown) at a controlled rate through the inlet conduit 2 of the sonoelectrochemical cell 1 and passes up through the perforated channel 8 into the treatment zone 9 flowing between the outer ground electrode 7 and inner electrode 5 which are themselves acting as probes to monitor the electrical characteristics of the fluid-electrode medium by the electrical monitor 19. The fluid then weirs over the transverse outlet weir 10 into the chamber containing the UV lamp 14 and/or water quality probe 18 of the water quality monitoring device 17 before exiting the sonoelectrochemical cell 1 via the outlet conduit 3. It will be appreciated the water quality probe 18 could also be situated in the treatment zone 9, upstream of the sonoelectrochemical cell 1 or downstream of the sonoelectrochemical cell 1 together with multiple combinations of devices to monitor a range of water quality characteristics. In full automation the liquid characteristic are determined by the electrical monitor 9 and water quality monitoring device 17 along with external data such as flow rate and communicated to the master controller 20. The information is used by the master controller 20 to determine the appropriate settings of voltage and electrical current for the electrolysis power supply 4, and ultrasound frequency and power for the ultrasonic power supply 13. The correct treatment regime may, for example, be determined by reference to stored mathematical-chemical models, daily flow rate and contaminant loading profiles, algorithms and may involve the use of fuzzy logic control, neural networks and predictive computational software. In manual or semi-automatic mode, the voltage, current, ultrasound frequency and power may be manually selected by switches, HMI or similar on the master controller 20. Information relayed back to the master controller 20 may be stored on an internal data card, displayed on HMI screen or similar or relayed to a remote location by data transfer. Remote control of the sonoelectrochemical cell 1 may also be controlled by use of web-enabled software or similar data transfer networks.

During operation the pumped flow rate, voltage and amperage and ultrasound frequency and power are selected to give the optimum degree of treatment and efficiency. This may be done manually or automatically as described above. During normal operation it is preferred to continually pump liquid through the sonoelectrochemical cell 1 and to continually apply a voltage, current, ultrasound frequency and power to the electrode 5. Whilst the sonoelectrochemical cell 1 is suitable for use in the treatment of a continuous flow of liquid, it will be appreciated that the unit could also be used in batch mode in which a predetermined volume of liquid is pumped into the treatment zone 9, a voltage, current, ultrasound frequency and power is applied across the treatment zone to treat the liquid for a predetermined time after which the electrolysis and sonication systems are switched off and the pump started to flush the treated liquid from the treatment unit and to introduce the next aliquot of liquid for treatment.

In the embodiment described above, the UV treatment process is integral with the electrolysis and sonochemistry. For high solids loading it may be desirable to increase effectiveness of the treatment process, for the material to be removed prior to the UV treatment as the UV process relies on light penetration through clear liquids. That may be achieved by solid-liquid separation or fractionation prior to the UV treatment. Thus, it may be preferred for the UV source to be provided downstream of the sonoelectrochemical cell 1.

In the embodiment described above and shown in the drawings, only one sonoelectrochemical cell (with parallel cell units 1*a*, 1*b*) has been described which has a monopolar electrode configuration. It may be advantageous, for large volume waste streams, to include a number of electrodes and size of sonoelectrochemical cell and also to increase the number of sonoelectrochemical cells into a treatment process. In that case a number of cells could be configured so that the electrodes for each cell may be configured as bipolar or multipolar. The treatment cells could also be configured as simplex (single units), duplex (duty, standby and duty and assist) or multi-stage. In these cases the individual treatment units could consist of units mounted onto support frames with common inlet and outlet manifolds. Such a system could consist of cells in series or parallel arrangement, depending upon waste stream characteristics and degree of treatment required. For mixed waste streams it may also be advantageous to include treatment units having different electrode materials and combinations. For high solids throughput it may also be advantageous to carry out pre-treatment before the liquid is introduced into the unit.

Also, although the embodiment shows parallel cells 1a, 1b, it would also be possible to use the cells 1a, 1b in series with different anodes 5.

Figure 3:
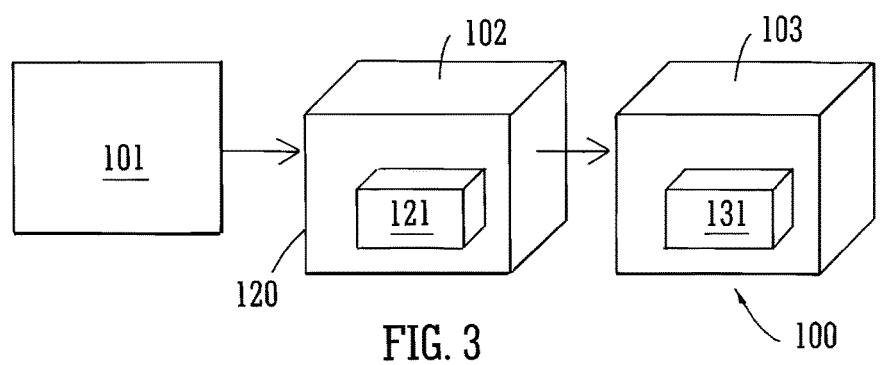
FIG. 3 is a schematic representation of a system of the invention.

The above-discussed sonochemical treatment unit TU or another sonoelectrochemical treatment unit of the invention can be deployed as part of a water treatment plant 100 as shown in FIG. 3. The plant 100 comprises a sonoelectrochemical zone or unit 101 in accordance with the invention, a mixing zone or unit 102 and a clarifying zone or unit 103.

The mixing zone or unit 102 may comprise a tank 120 to receive fluids from the sonoelectrochemical zone or unit 101 and to deliver fluid to the clarifying zone or unit 103.

The tank 120 may comprise means 121 to facilitate mixing of the fluid passing therethrough. Such mixing means 121 may comprise one or more mechanical mixing means and/or baffles arranged to provide a tortuous flow path through the tank 120. The tank 120 may be designed to cause agglomeration and/or flocculation of particles therewithin such that entrained particles are able to increase in size as they transit along or through the tank 120. The presence of baffles increases the effective length of the flow path for fluid and hence increases residence times for a given fluid flow velocity (and/or volume throughput), thereby affording particles within transiting fluid the opportunity to agglomerate and/or flocculate. Where mechanical mixing means are deployed it may be advantageous to have a greater degree of mixing at an upstream end of the mixing zone or unit as compared to the downstream end. This may be achieved, for example, by having a flash mixer upstream of a paddle stirrer. Different parts of the mixing zone or unit may be demarcated, for example by one or more baffles, or the upstream and downstream portions may not be formally demarcated.

Downstream of the mixing zone or unit 102 is the clarifying zone or unit 103. Within the clarifying zone or unit 103 there may be provided clarifying means to cause particles within the entrained fluid to settle, or otherwise be removed from the fluid, thereby to ensure that fluid exiting the clarifying zone or unit 103 has a reduced particle burden (for example, as measured in grams of particles per cubic centimeter [g/cc] or numbers of particles per cubic centimeter [N/cc] as compared to that entering the clarifying zone or unit 103). Examples of such clarifying means 131 include filters, lamella settlers, centrifuges and the like.

Indeed, due to the unique construction of the sonochemical treatment unit of the invention it is possible to construct complete water treatment plant with a very small footprint and with a concomitant low energy demand.

Figures 4A, 4B:
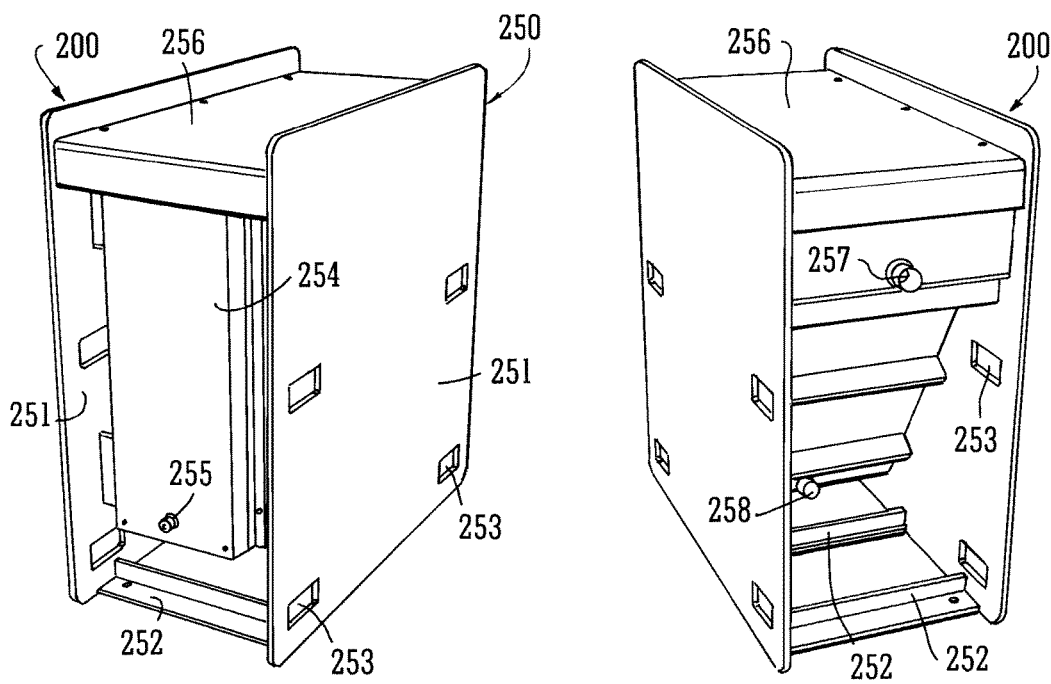
FIGS. 4A, 4B and 4C are respectively a front isometric view of a water treatment plant according to the invention, a rear isometric view of the plant of FIG. 4A and a plan view of the plant of FIG. 4A.
Figure 4C:
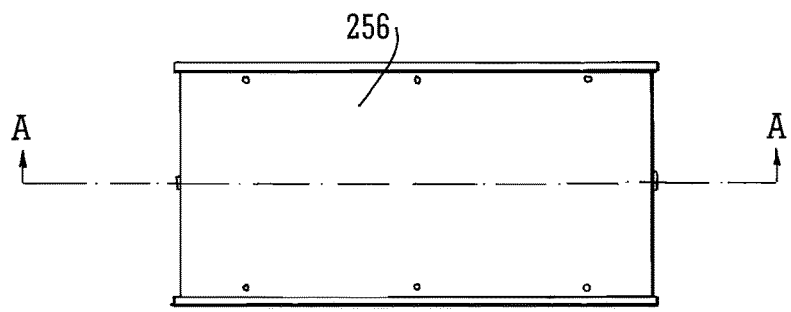

Referring to FIGS. 4A, 4B and 4C, there is shown a water treatment plant 200 with a very small footprint. The water treatment plant 200 comprises a frame 250 having a pair of walls 251 and connecting struts 252. Hand holds 253 are provided in the walls 251 (four on each wall 251 in this embodiment) to enable the plant 200 to be lifted and manoeuvred by hand. The water treatment plant 200 includes a front cover 254 provided with a fluid inlet 255 and a lid 256.

At the rear of the treatment plant 200 is a fluid outlet 257 for egress of treated fluid and a waste outlet 258 for egress of waste.

In use, a supply of fluid to be treated is connected to the inlet 255 and treated fluid is collected from the outlet 257. A pump (not shown) is used to drive fluid from the source to the inlet 255.

A source of power is used to energise the pump and a source of electricity is used to energise the treatment plant 200.

Figure 5A:
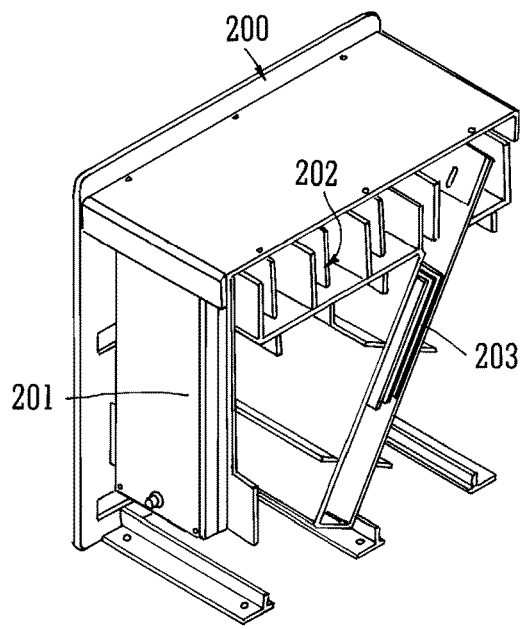
FIGS. 5A, B and 5C are respectively an isometric cutaway view of the plant of FIG. 4A, a sectional view along line A-A of FIG. 4C and a plan view of the plant of FIG. 4C absent the lid.
Figure 5B:
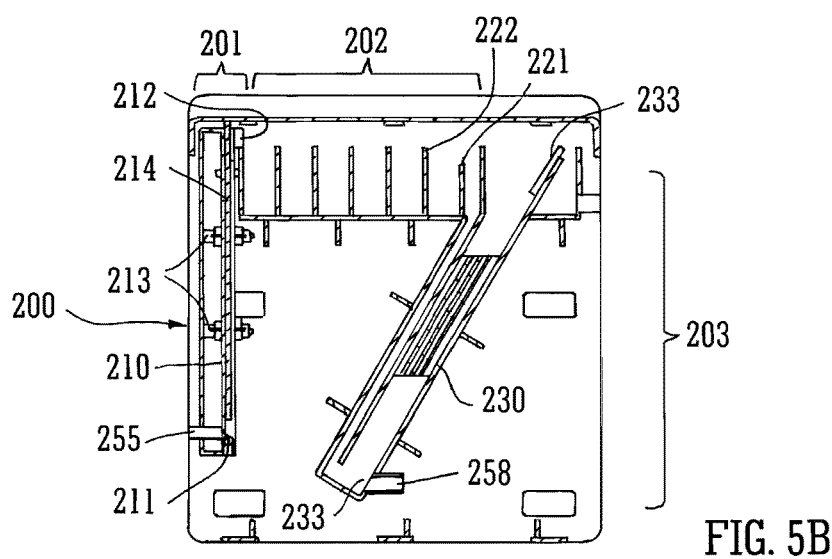
Figure 5C:
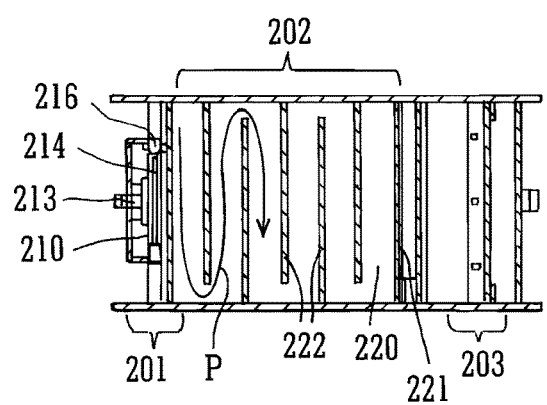

Referring now to FIGS. 5A, 5B, 5C, the various internal components of the treatment plant 200 are shown including a sonoelectrochemical zone 201, a mixing zone 202 and a clarifying zone 203.

The sonoelectrochemical zone 201 comprises a tank 210 provided with a relatively lower inlet 211 and a relatively higher weir outlet 212. The inlet 211 communicates with the fluid inlet 255 and the weir outlet 212 provides a point of egress to the mixing zone or unit 202.

Mounted to the tank 210 is a plurality of ultrasonic generation means 213. Located within the tank 210 is an electrode 214. The electrode 214 is electrically isolated from the tank 210 by non-conductive sheathing elements 216. The tank 210 is or forms a ground electrode and the electrode 214 is an anode. Typically the tank will be formed from stainless steel or another iron alloy and the electrode 214 may be formed from a variety of materials, as explained above.

The mixing zone 202 comprises a mixing tank 220 which accepts fluid from the weir outlet 212 and delivers water to the clarifying zone 203 via an outlet weir 221. Within the mixing tank 220 are a plurality of baffles 222 which define a tortuous flow passage (indicated by arrow P) for fluid passing through the mixing zone 202. The baffles 222 act to increase the length of the fluid flow path P through the tank 220. The baffles 222 are shown as being equi-spaced, however, preferably the baffles 222 will be relatively closely spaced at the inlet end of the mixing zone or unit 202 and relatively further spaced at the outlet end of the mixing zone or unit 202 (closer spacing is likely to increase the amount of turbulence generated in transit and hence the mixing).

Fluid exiting the mixing zone or unit 202 over the outlet weir 221 passes to the clarifying zone or unit 203. In this embodiment the clarifying zone or unit comprises a lamella settling unit 230. Conveniently, the lamella settling unit 230 is angled so as to be partly accommodated under the mixing zone or unit 202, thereby ensuring a small footprint of the unit 200. Fluid which exits the clarifying zone or unit 203 does so over an outlet weir 232 and thence to the outlet 257. The lamella settling unit 230 is provided with a waste outlet 233 which is fluidly connected to outlet 258 for the removal of waste sludge, slurry or particles separated from the fluid.

In use, and with the electrodes 210, 214 energised by a power supply, and with the ultrasound generation means 213 energised by the same or a dedicated power supply (where the supply is the same circuitry will be provided to ensure the electrical supply to each of the electrodes 210, 214 and ultrasound generation means 213 is appropriate) fluid to be treated (for example dirty or waste water) is pumped by a pump (not shown) from a source to the inlet 25 and thence to the sonoelectrochemical zone 201 whereupon the fluid will pass between the walls of the tank 210 (which is the grounded electrode) and the anode electrode 214 to be exposed to the electrical field therebetween. At the same time the fluid will be exposed to ultrasound energy generated by the ultrasound generation means 213.

Treated fluid exits the sonoelctrochemical zone or unit 201 via weir outlet 212 and thence to the mixing zone 202. As the fluid transits the tank 220 along fluid path P around the baffles 222 the particles or species entrained therein will start to agglomerate and/or flocculate. As the fluid exits the mixing zone or unit 202 and passes to the clarifying zone or unit 203 the entrained particles will be carried therewith. In the clarifying zone or unit 203, by action of the lamella settling unit 230 entrained (agglomerated and/or flocculated) particles will settle from the fluid and clean (or at least relatively cleaner) fluid is able to exit via weir 233 and outlet 257.

In our initial tests, a very small footprint unit (1200 mm×570 mm) has been able to generate 10 liters of clean potable water for up to 200 people a day when supplied with power from foldable solar panels. The solar panels generated 5V at 12 A which was sufficient to continuously provide potable water from a dirty water source. We believe that this indicates that a small-footprint water plant 200 made in accordance with the invention, and which is man-manouverable, can be used to provide potable water from a dirty water source for plural families or individuals in even the most remote of locations. Additionally or alternatively, other renewable energy sources could also be used as sources of external power, for example turbines, fuel cells, heat pumps, etc.

Such a small water treatment plant is hugely beneficial, not least because it can be shipped on a standard pallet (providing a 1000×1200 mm platform) to a remote area. If provided with electricity from solar panels the plant 200 can be self-powered and operational within minutes of being located on site.

As will be appreciated, larger units can be deployed and, if not in remote locations (or if an electricity supply is available) the power can be supplied by any suitable generation means.

The following non-limiting example illustrates the invention:

EXAMPLE

A liquid waste stream consisting of water contaminated mains water was pumped through a treatment unit according to FIGS. 1 and 2 at a flow rate 5 of 11 liters/second. A current of 1 amp was a maintained between the aluminium electrode and stainless steel ground electrode. The voltage was measured with the ultrasound process OFF and then repeated with the ultrasound process ON and repeated 5 times to determine if there was an energy efficiency gain by including ultrasound to the electrolysis process:

TABLE 1

Effect of Ultrasound on the Electrolysis process

| Run | Ultrasound OFF | Ultrasound ON | % Efficiency |
|---|---|---|---|
| 1 | 159 V | 114 V | 28 |
| 2 | 158 V | 111 V | 30 |
| 3 | 160 V | 114 V | 29 |
| 4 | 155 V | 112 V | 28 |
| 5 | 157 V | 114 V | 28 |

In a second example the liquid composition was iron rich acid mine water (AMD) containing soluble iron at a concentration of 70 mgl$^{-1}$. The liquid was pumped through the unit at a rate of 5000 liters per hour. A MMO (mixed metal oxide) of platinum was used as the electrode with a stainless steel ground cathode. The treatment was run with the ultrasound OFF and then repeated with ultrasound ON. The resultant samples were allowed to stand for 30 minutes to allow settlement of iron floc material and the supernatant was measured for residual iron. This test was repeated after 24 hours settlement:

TABLE 2

Comparison of rate of iron removal by electrolysis with and without ultrasound

| | | Ultrasound OFF | | Ultrasound ON | |
|---|---|---|---|---|---|
| Time | Sample mgl$^{-1}$ Fe | mgl$^{-1}$ Fe | % Removal | mgl$^{-1}$ Fe | 5 Removal |
| After 30 mins | 70 | 37 | 47% | 10 | 86% |
| After 24 hours | 70 | 8 | 89% | 4 | 94% |

In a third example the efficiency of the proposed electrolysis electrode configuration whereby the central first anode electrode is opposed on both sides by a single second grounded electrode was compared to 3 electrode filament in which the outer 2 electrodes were connected as grounded cathodes and the central anode was connected as an anode. For each test a fixed current set point of 1 amp was selected. Liquid was then pumped through each unit and the voltage was note. The spacing distance between cathode and anode was fixed at 10 mm for each treatment unit.

TABLE 3

Comparison between central anode opposed on both sides by single ground cathode and 3 filament electrode consisting of two outer cathodes and central anode.

| Electrode configuration | No. of anode surfaces | Current set point | Voltage required | % efficiency |
|---|---|---|---|---|
| Central anode + single grounded cathode | 2 | 1 amp | 109 volts | 70% |
| 3 filament electrode with 2 outer cathodes and central anode | 2 | 1 amp | 175 volts | n/a |

The combination of sonochemistry with electrolysis offers advantages over conventional water and wastewater treatment, industrial effluent processing, and sonochemistry or electrolysis when used on their own for the decontamination of fluids. A drawback with existing processes is that, when combining the two treatment systems, electrical interference occurs between the electrodes of the electrolytic unit and the transducers of the sonication unit. The present invention overcomes this electrical interference by placing the piezoelectric (ultrasonic) transducers on to the outside surface of a grounded electrode (cathode). The anode electrode is placed on the opposing side of the grounded electrode and defines a treatment zone through which liquid can be passed and simultaneously be treated by electrolysis and sonication. Trials using the present invention demonstrated improved treatment effectiveness, efficiency and reduced cost in comparison with pure electrolysis.

The invention claimed is:

1. A fluid treatment unit comprising a first plate anode electrode with a pair of matching major surfaces, a second grounded electrode which defines a tank within which fluid is flowable from an inlet to an outlet, and an ultrasound generator externally mounted on the second grounded electrode, the second grounded electrode and the first plate anode electrode defining between them a treatment zone, the inlet being for introduction of fluid to the treatment zone and the outlet being for egress of treated fluid from the treatment zone, the treatment zone providing a flow path along which fluid entering through the inlet is flowable towards the outlet, the flow path extending substantially along the surface of both the second grounded electrode and each of a facing one of the pair of matching major surfaces of the first plate anode electrode.

2. The unit according to claim 1, wherein the first plate anode electrode is symmetrically located within the tank.

3. The unit according to claim 1, wherein the ultrasound generator comprises of a plurality of piezoelectric elements arranged in an array directly attached to the outside surface of the second grounded electrode.

4. The unit according to claim 1, wherein the second grounded electrode is electrically insulated so as to prevent electrical interferences between the first plate anode electrode and the ultrasound generator.

5. The unit according to claim 1, wherein the inlet is fluidly connected to an inlet channel which is provided with inlet perforations or apertures.

6. The unit according to claim 5, wherein the inlet channel extends across the treatment zone in a direction transverse to the principal direction of flow within the treatment zone.

7. The unit according to claim 1, wherein the outlet comprises an overflow outlet.

8. The unit according to claim 1, further comprising a source of UV light arranged to irradiate liquid that passes through the unit and wherein the UV source is at or in the vicinity of the outlet.

9. The unit according to claim 1, wherein the separation between the second ground electrode and each of the facing one of the pair of matching major surfaces of the first plate anode electrode is 100 mm or less.

10. A fluid treatment system comprising the fluid treatment unit according to claim 1, the system further comprising a power source for applying a voltage to the first plate anode electrode.

11. The fluid treatment system according to claim 10 comprising a monitor for monitoring one or more characteristics of the fluid either:
(i) within the treatment zone;
(ii) upstream of the treatment zone; or
(iii) downstream of the treatment zone.

12. The fluid treatment system according to claim 11, wherein the monitor or monitoring means is operable to conduct or determine one or both of the following measurements: i) electrical characteristics of the fluid across the first plate anode electrode and second grounded electrode; or ii) water quality characteristics of the fluid.

13. The fluid treatment system according to claim 11, further comprising a controller for receiving information from the monitor of the treatment system and external information to control the flow rate of fluid within the treatment zone.

14. The fluid treatment system according to claim 13, wherein the controller is operable to control one or more of the following: i) the applied current and voltage to the electrode on dependence on one or more characteristics monitored by the monitor; ii) the applied ultrasound frequency and power to the ultrasound generator on dependence on one or more characteristics monitored by the monitor; or iii) the applied current and voltage to the electrodes and frequency and power of the ultrasound generator independent of the monitor.

15. The fluid treatment system according to claim 10, further comprising a mixing unit, arranged to accept fluid egressing from the treatment unit.

16. The fluid treatment system according to claim 15, wherein the mixing unit comprises a plurality of baffles.

17. The fluid treatment system according to claim 10, further comprising a clarifying unit arranged to accept fluid which has egressed from the treatment unit.

18. The fluid treatment system according to claim 10, further comprising a mixing unit, arranged to accept fluid egressing from the treatment unit and clarifying unit arranged to accept fluid from the mixing unit.

19. The fluid treatment system according to claim 18, having a footprint of less than 1000×1200 mm.

20. A method of treating fluid, comprising causing the liquid to flow along a surface of each of a first plate anode electrode and a second grounded opposed electrode, the second grounded electrode defining a tank in which fluid is flowable from an inlet to an outlet and wherein an ultrasound generator is externally mounted to the second grounded electrode and simultaneously applying a voltage across the first plate anode electrode and second grounded electrode to produce an electrolytic current, by means of a power supply, through the flowing liquid and an ultrasonic wave between the first plate anode electrode and second grounded opposed electrode through the flowing liquid via the ultrasound generator.

* * * * *